March 3, 1942.  R. W. EICHENBERGER  2,274,825
SEALING MEANS FOR CONVEYING APPARATUS
Filed March 27, 1941   2 Sheets-Sheet 1
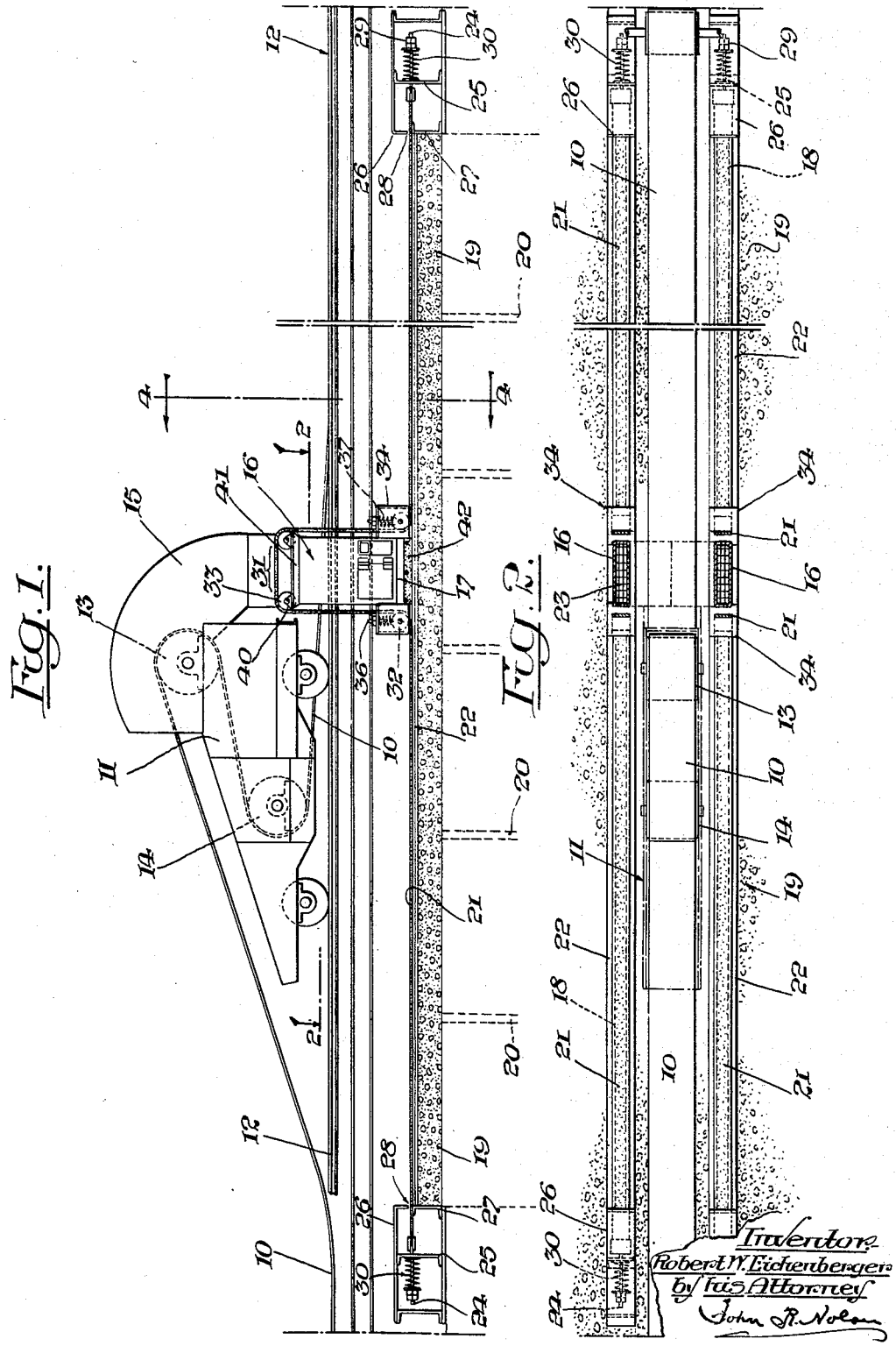

March 3, 1942.  R. W. EICHENBERGER  2,274,825
SEALING MEANS FOR CONVEYING APPARATUS
Filed March 27, 1941  2 Sheets-Sheet 2
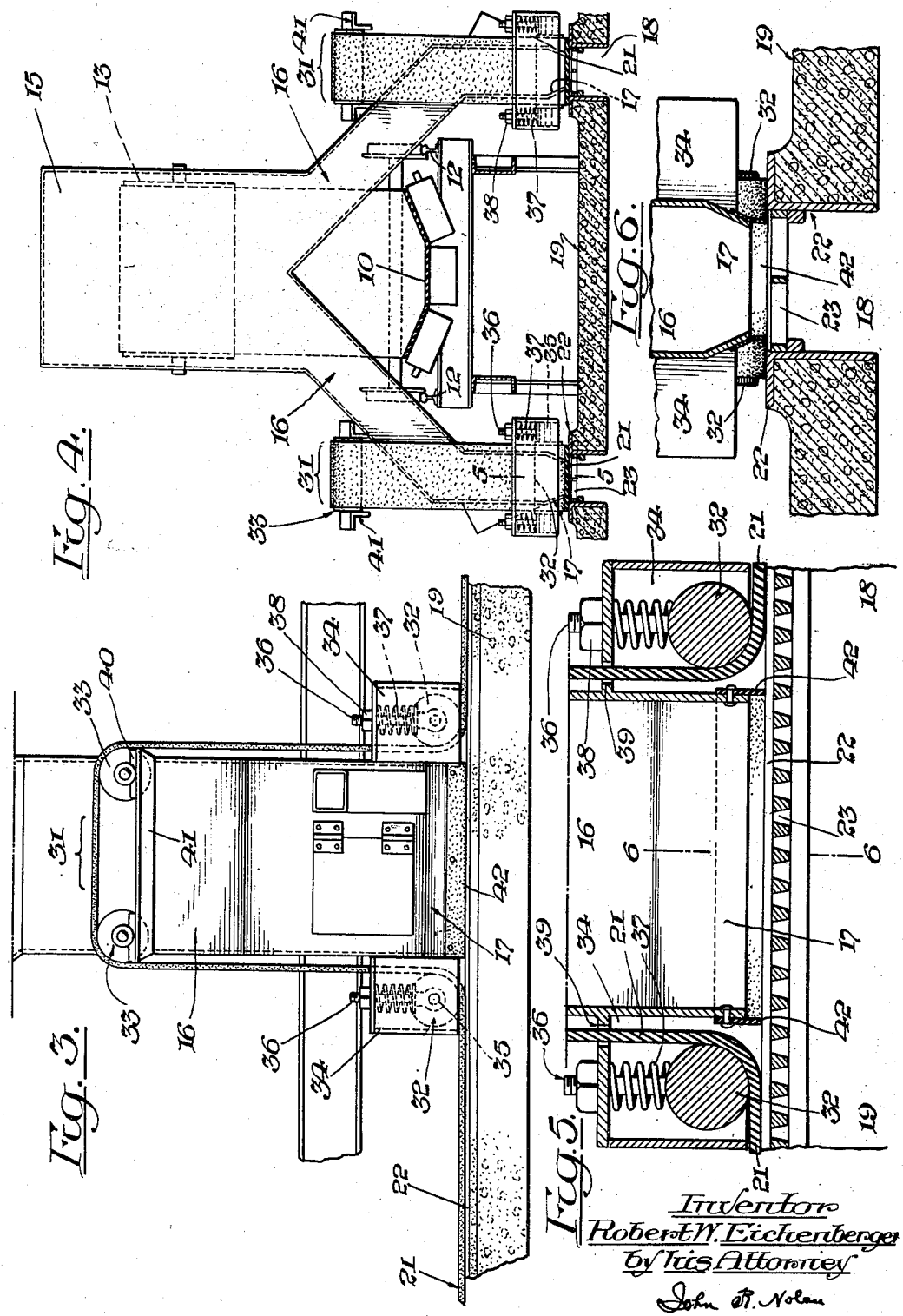
Inventor
Robert W. Eichenberger
by his Attorney
John R. Nolan Patented Mar. 3, 1942

2,274,825

UNITED STATES PATENT OFFICE 2,274,825

SEALING MEANS FOR CONVEYING APPARATUS

Robert W. Eichenberger, Nutley, N. J., assignor to Robins Conveying Belt Company, Passaic, N. J., a corporation of New Jersey Application March 27, 1941, Serial No. 385,498

8 Claims. (Cl. 214—17)

This invention relates to conveying apparatus of the kind in which a travelling tripper structure, arranged in co-operative relation to a conveyer belt, is effective to discharge coal, ore or other material from the belt into a hopper included in said structure, which hopper is provided with a depending chute, or chutes, leading to a floor structure having a longitudinal opening, or openings, through which the material escaping from the chute is delivered to underlying storage bunkers.

The object of my invention is to provide a simple and efficient closure for sealing the opening or openings of the floor structure throughout its length except at the particular point or points where the tripper delivers the material, at which delivery point or points the opening or openings are sealed at the mouth of the chute in a manner to prevent the escape of dust at this point.

In the form of embodiment herein illustrated of my invention the closure comprises a flexible web of substantial length which is held under tension at its respective ends so as to overlie and seal the longitudinal opening of the floor structure, the body of the web being upwardly looped about the proximate depending chute of the tripper so as to bridge that portion of the opening which leads to the bunker adjacent to which the tripper structure is located.

The invention also comprises features of construction and combinations of parts which will be hereinafter described, the scope of the invention being expressed in the appended claims.

In the drawings—

Figure 1 is a side elevation of a portion of a conveying apparatus embodying the principle of my invention.

Fig. 2 is a horizontal section in a plane through the tripper chutes, as on the line 2—2 of Fig. 1.

Fig. 3 is a side elevation of one of the chutes, showing the loop of the sealing web, and adjuncts.

Fig. 4 is a transverse vertical section, as on the line 4—4 of Fig. 1.

Fig. 5 is a longitudinal vertical section through the lower portion of one of the chutes, as on the line 5—5 of Fig. 4, showing pressure rollers about which the sealing web is trained at the respective sides of the chute.

Fig. 6 is a transverse vertical section, as on the line 6—6 of Fig. 5.

Referring to the drawings, 10 designates a portion of an endless conveyer belt for coal, ore or other material, and 11 designates a travelling tripper therefor of usual construction, which tripper includes a wheeled structure mounted to travel on parallel rails 12 extending from end to end of the underlying storage space. The wheeled structure is equipped with upper and lower pulleys 13 and 14 about which the belt 10 is trained, and also with a hopper 15 into which the material is discharged from the belt as the latter passes over the upper pulley 13 in the usual manner. The hopper has downwardly diverging chutes 16 terminating in depending discharge portions 17 that overlie the respective longitudinally extending openings or slots 18 of the floor or bed 19 of the apparatus. Thus the material discharged into the hopper is delivered through the openings to underlying storage bunkers 20 indicated by dotted lines in Fig. 1.

According to my invention a superposed elongated web 21, preferably of belting material, is arranged to overlie each of the floor openings 18, which web is of sufficient width to cover the opening and rest upon the top of the angle pieces 22 constituting the side walls of the opening, excepting as hereinafter pointed out. The opening is preferably provided throughout its length with a metal grating 23 upon which the web may also rest.

The ends of the web, 21, at points adjacent the respective ends of the opening 18, are anchored or restrained by means, for example, of spring-retracted tension rods 24 to which the ends of the web are fastened. These rods are slidably guided in the vertical partitions 25 of suitably located housings 26, whereof the inner end walls 27 are slotted, as at 28, for the free passage of the respective ends of the web. Each of the rods 24 has preferably threaded thereon adjusting nuts 29 by the manipulation of which the tension of the springs 30 on the rods 24 can be adjusted as occasion may require.

The web, which is somewhat greater in length than that of the opening 18, is flexed to afford a vertical loop 31 which slidably embraces the adjacent tripper chute 16 so as to span the portion of the opening under the mouth of the chute wherever the tripper may be positioned along the opening, and this while the remainder of the opening is effectually sealed by the web. As herein shown the looping of the web is accomplished by training it about exteriorly mounted rollers 32 at the bottom of the chute, and also over rollers 33 overhanging the upper portion of the chute. The bottom rollers are mounted to exert yielding downward pressure on the web, thus maintaining the latter in close contact with the floor at the proximate sides of the chute.

Accordingly the rollers 32 are contained in open bottom housings 34, which are integral with or fixed to the sides of the chute, the trunnions 35 of the rollers being carried by spring pressed rods 36 depending within the respective housings, and the tension of the springs 37 on the rods being adjustable by means, for example, of nuts 38 threaded on the rods. The tops of the roller housing 34 are suitably slotted, as at 39, for the free vertical movement of the loop portion of the web coincidentally with the travel of the tripper longitudinally of the opening in the floor or bed 19. The upper pair of rollers 33 are journaled in brackets 40 which are mounted on bars 41 fixed to the exterior of the respective chutes.

As shown the lower ends of the walls of each of the chutes have secured thereto flexible sealing strips 42, of rubber or other suitable material, which yieldingly bear upon the top of the adjacent slotted portion of the floor 19, thus effectually preventing the escape of dust in the region of the chute.

From the foregoing it will be seen that the loop of each of the sealing webs 21 is formed coincidentally with the travel of the tripper chute in each direction along the entrance opening in the floor of the conveying apparatus, thereby affording communication between the chute and a selected bunker or bunkers in the vicinity of the tripper, and that when the tripper and the loop of the web are thus positioned at any point the remainder of the entrance opening between the chute and the respective ends of the opening is effectually sealed by the body of the web, which web is maintained under tension as hereinbefore mentioned.

It is to be understood that the invention is not limited to the particular exemplifying form thereof herein disclosed, as the construction may be modified within the principle of the invention and the scope of the appended claims.

I claim:

1. In an apparatus of the kind described embodying a conveyer belt, a movable tripper including a delivery chute into which the material on the belt is discharged by the tripper, and an element extending lengthwise of and below the path of the chute and having a longitudinal opening leading to a storage space, an elongated sealing web overlying the said opening, and means for guiding said web in embracing relation to the chute to form in the web coincidentally with the travel of the tripper a loop spanning that portion of said opening under the chute while the main body of the web is in sealing relation to the remainder of said opening.

2. In an apparatus of the kind described embodying a conveyer belt, a movable tripper including a delivery chute into which the material on the belt is discharged by the tripper, and an element extending lengthwise of and below the path of the chute and having a longitudinal opening leading to a storage space, an elongated sealing web overlying said opening, end restraining means for said web, and means for guiding said web in embracing relation to the chute to form in the web coincidentally with the travel of the tripper a loop spanning that portion of said opening under the chute while the main body of the web is in sealing relation to the remainder of said opening.

3. In an apparatus of the kind described embodying a conveyer belt, a movable tripper including a delivery chute into which the material on the belt is discharged by the tripper, and an element extending lengthwise of and below the path of the chute and having a longitudinal opening leading to a storage space, an elongated sealing web overlying said opening, spring tension means for the ends of said web, and means for guiding said web in embracing relation to the chute to form in the web coincidentally with the travel of the tripper a loop spanning that portion of said opening under the chute while the main body of the web is in sealing relation to the remainder of said opening.

4. In an apparatus of the kind described embodying a conveyer belt, a movable tripper including a delivery chute into which the material on the belt is discharged by the tripper, and an element extending lengthwise of and below the path of the chute and having a longitudinal opening leading to a storage space, an elongated sealing web overlying said opening, restraining means for the ends of said web, means including pressure members for guiding said web in embracing relation to the chute to form in the web coincidentally with the travel of the tripper a loop spanning that portion of said opening under the chute while the main body of the web is in sealing relation to the remainder of said opening.

5. In an apparatus of the kind described embodying a conveyer belt, a movable tripper including a delivery chute into which the material on the belt is discharged by the tripper, and an element extending lengthwise of and below the path of the chute and having a longitudinal opening leading to a storage space, an elongated sealing web overlying the said opening, and means for guiding said web in embracing relation to the chute to form in the web coincidentally with the travel of the tripper a loop spanning that portion of said opening under the chute while the main body of the web is in sealing relation to the remainder of said opening, said chute having depending sealing strips bounding the mouth of the chute overlying the said opening.

6. In combination with an ore bin having a long narrow charging opening, a track in substantial parallelism with said opening, a carriage on said track, means associated with said carriage for charging ore through said opening, a belt overlying said opening, guides on said carriage, said belt running over said guides to uncover a portion of said opening adjacent the carriage, said carriage being arranged for movement longitudinally of said opening and longitudinally of said belt to change the position of said charging means and produce a corresponding change in the position of the uncovered portion of said opening.

7. In combination with an ore bin having a long narrow charging opening, a track in substantial parallelism with said opening, a carriage on said track, means associated with said carriage for charging ore through said opening, a belt overlying said opening, guides on said carriage, said belt running over said guides to uncover a portion of said opening adjacent the carriage, said carriage being arranged for movement longitudinally of said opening and longitudinally of said belt to change the position of said charging means and produce a corresponding change in the position of the uncovered portion of said opening, said guides comprising pulleys mounted on the carriage and disposed between said belt and opening.

8. In combination with an ore bin having a long narrow charging opening, a track in substantial parallelism with said opening, a carriage on said track, means associated with said carriage for charging ore through said opening, a belt overlying said opening, guides on said carriage, said belt running over said guides to uncover a portion of said opening adjacent the carriage, said carriage being arranged for movement longitudinally of said opening and longitudinally of said belt to change the position of said charging means and produce a corresponding change in the position of the uncovered portion of said opening, said guides comprising pulleys mounted on the carriage and disposed between said belt and opening, and said guides also comprising pulleys mounted on the carriage adjacent said opening to hold the belt against the opening at each side of said first-named pulleys.

ROBERT W. EICHENBERGER.